United States Patent [19]

Wilson, Jr.

[11] 3,844,041
[45] Oct. 29, 1974

[54] NAVIGATION AID

[76] Inventor: Lester E. Wilson, Jr., 1 Short St., Bedford, Mass. 01730

[22] Filed: May 8, 1972

[21] Appl. No.: 250,962

[52] U.S. Cl.................................. 33/1 SD, 33/78
[51] Int. Cl............................................ G01c 21/20
[58] Field of Search........ 33/1 SD, 76 VA, 76 R, 78

[56] References Cited
UNITED STATES PATENTS

| | | | |
|---|---|---|---|
| 1,896,997 | 2/1933 | Bennett | 33/76 VA |
| 2,114,652 | 4/1930 | Dalton | 33/1 SD |
| 2,756,929 | 7/1956 | McGee | 33/76 R UX |
| 3,094,781 | 6/1963 | Vangor | 33/1 SD |
| 3,456,352 | 7/1969 | Bowen | 33/76 R |
| 3,540,127 | 11/1970 | Kane | 33/1 SD |

FOREIGN PATENTS OR APPLICATIONS 50,370   1/1940   France................................ 33/1 SD

*Primary Examiner*—William D. Martin, Jr.

[57] ABSTRACT

A navigation aid for determining magnetic compass setting accommodates replaceable charts mounted on a surface along with a compass rose, both the chart and the compass rose being rotatable on the surface, whereby rotational orientation of the chart and compass rose with respect to indices on the surface provides course correction for magnetic compass variation and an overlay on the chart providing a line between two designated points to define the desired course reveals magnetic heading on the compass rose to navigate from one of the points to the other.

9 Claims, 7 Drawing Figures

NAVIGATION AID

This invention relates to navigation instruments, and more particularly, to small, hand-held navigation devices suitable for use on small boats.

Course plotting navigation aids suitable for use in the limited space of a small craft have been proposed in the past and they usually consist of a number of overlays of either rigid or flexible sheets, containing various kinds of indices. This pack of overlays is placed on top of a chart and each overlay is adjusted in relationship to the others and in relationship to the chart, to finally determine the magnetic heading to sail or fly a course from one point on the chart to another. A few of the disadvantages of these devices are that the three or more transparent overlays, with markings on each, are usually made of plastic to withstand the rough treatment they get on a small craft and the plastic is not sufficiently clear that one can look through three or more layers of it and discern details on the chart beneath. Furthermore, these devices are used by laying them on the chart, on the area of navigation, and so the user must fold up the rest of the chart to get it out of the way.

It is one object of the present invention to provide a navigation aid for determining magnetic heading and on which the chart is viewed through no more than one transparent overlay.

It is another object to provide such a navigation aid which accommodates sections of chart readily mounted to and becoming part of the navigation aid and contained totally within the dimensions of the aid.

It is another object to provide a navigation aid for determining the magnetic compass heading to reach a destination from a departure point.

It is another object of the invention to provide a navigation plotting device, for which sections of any chart can be accommodated and can be used with the device, regardless of the scale or the angular orientation of the chart in the device.

It is a further object of a particular embodiment to provide a navigation aid as in the aforementioned object, which can be used with any chart no matter what the scale and one requiring only that the chart be folded or made to a predetermined size and mounted to the aid.

It is a general object of all embodiments of the present invention to provide a navigation aid for determining magnetic heading for a selected course, which is compact, durable, waterproof, easy to use, requires no calculations, and in which the chart can be replaced with a minimum number of operations.

In accordance with the present invention, the navigation aid consists of a chart and a compass rose, rotatably mounted on a common axis on a support surface, with suitable indices on the chart and/or the compass rose and the support surface for orienting the chart and the compass rose so that an overlay of lines, which may be separate or a part of the compass rose, defines the desired course on the chart, whereupon the compass rose indicates the magnetic heading to navigate the course from one point to another on the chart. The only overlay covering the chart is an overlay of course lines, which provides a line through the departure and destination points. In one embodiment of the invention, means are provided whereby this overlay can be set aside until it is used, so that there is nothing to obscure the chart. In all embodiments, the chart can be readily removed and replaced with another chart.

These and other objects and features of the present invention will be more apparent from the following specific description of embodiments of the invention taken in conjunction with the figures, in which.

The embodiments of the present invention described herein have in common that they all include a chart and a compass rose, rotatable on a base and a transparent overlay of course lines, with indices on the chart, compass rose and base, whereby at least the chart and compass rose are rotatably positioned on the base in accordance with the indices to determine the magnetic heading for a course between two points on the chart. The first and third embodiments described in FIGS. 1 to 3 and FIGS. 6 and 7, respectively, have the advantage that the chart can be removed and replaced without disturbing the other parts of the nevigation aid and, further, the course presented to the user is always from the bottom to the top of the navigation aid, and the heading in degrees for the course is always at the top of the aid. In the second embodiment, illustrated in FIGS. 4 and 5, the course presented to the user of the aid can be in any relative direction thereon, while the compass heading for that course is always presented at the top of the aid.

First Embodiment

Figure 1:
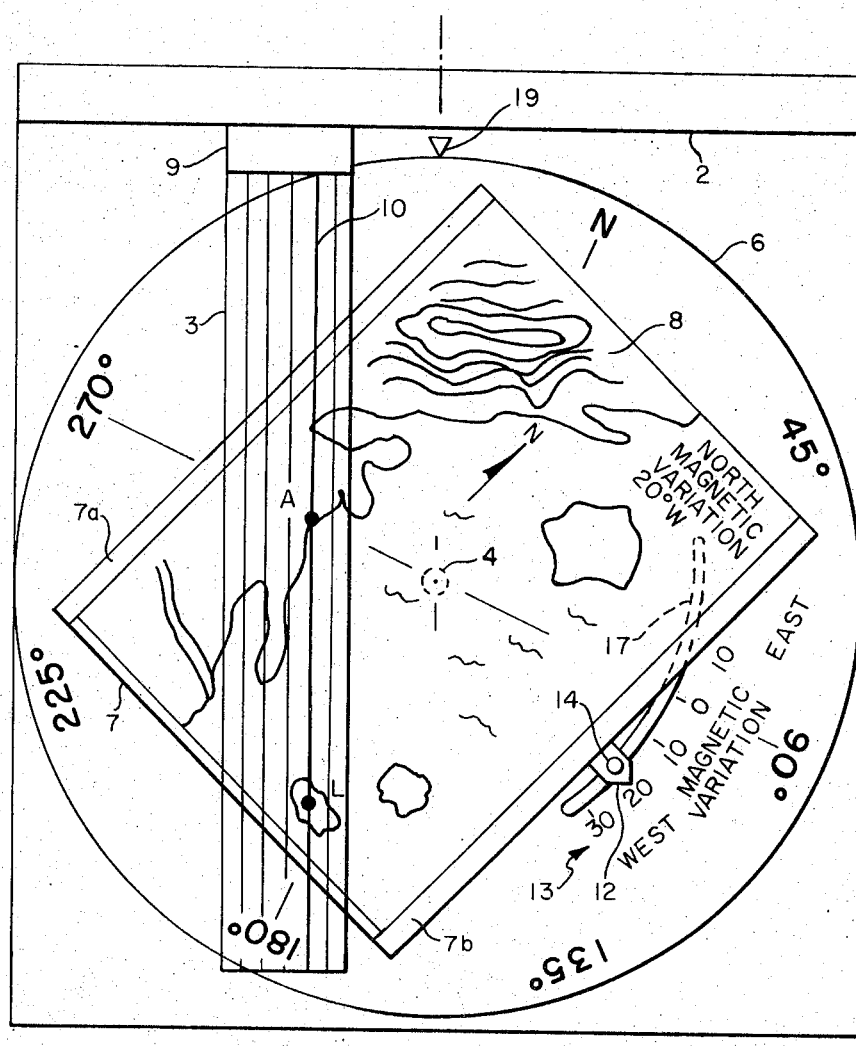
FIG. 1 is a plan view of an embodiment of the invention in which the navigation aid is an assembly of separate parts including a chart table, compass rose and an overlay on a platform, the table accommodating charts which can be easily removed and replaced thereon.
Figure 2:
FIG. 2 is an end view of the embodiment in FIG. 1.
Figure 3:
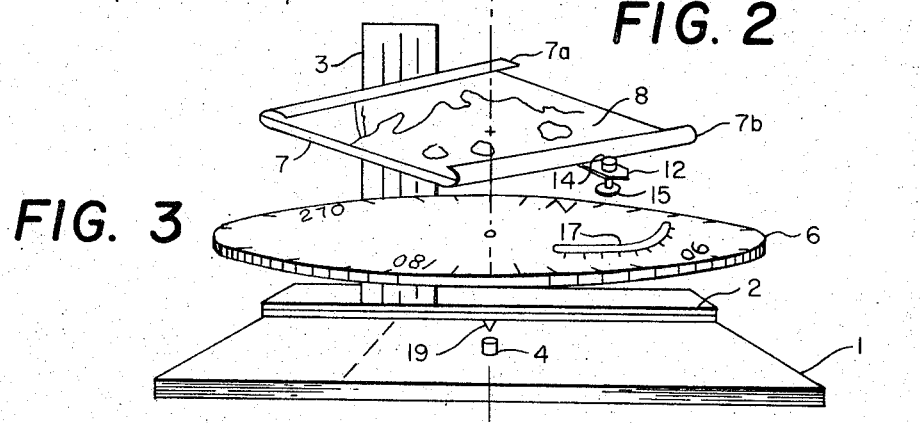
FIG. 3 is a front perspective exploded view of the embodiment in FIGS. 1 and 2.

In the first embodiment illustrated in FIG. 1, there is provided a flat base or board 1, which may be rigid or flexible. A track 2 at the top of the base 1 is preferably rigid and accommodates a transparent course overlay 3, slideably attached thereto. An axle 4 substantially at the center of the base 1 extends vertically from the base and accommodates the compass rose 6 and the chart holder 7, which are independently rotatable on the axis 4. The compass rose may be rigid or flexible, however, the chart holder is preferably rigid.

The chart holder 7 serves to hold the chart 8 in such a manner that the chart may be readily removed and a new chart substituted. To facilitate removal and replacement of the chart, the transparent course overlay 3 is flexible or hinged so that it can be lifted off the chart and the chart removed and replaced with another chart. The transparent overlay 3 is held by a slide member 9, which slideably engages the track 2 at the top of the board. The purpose of the transparent overlay is to provide a vertical line, such as line 10, extending from the top to the bottom of the navigation aid and which can be placed at any position across the chart by sliding member 9 along the track 2.

The parts of the chart holder 7 for holding the chart 8 may be simply channels 7a and 7b, formed by turning the ends of a rigid plate from which the chart holder is made. The edges of the chart slide into these channels, which hold the chart sufficiently for use. The chart need not be positioned precisely along the channels in the chart holder, however, it must not be rotatable on the axis 4 with respect to the chart holder.

In use and operation of the navigation aid shown in FIG. 1, the compass rose 6 and chart holder 7 are mounted on axle 4 and independently rotatable thereon. A particular chart selected from a library of charts made to the size of the chart holder 7 is placed in the chart holder by sliding the chart from the edge of the chart holder into the channels 7a and 7b. The chart preferably contains printed thereon the magnetic variation for the area charted or the magnetic variation for that area may be obtained from another source. Next, the chart holder is rotatably positioned relative to the compass rose, so that the fixed pointer index 12 on the chart holder points to the magnetic variation for the particular chart in the holder on magnetic variation scale 13 on the compass rose. In FIG. 1, for purposes of illustration, the magnetic variation is 20° West and so the index 12 on the holder points to 20° on the scale 13. Next, the chart holder 7 may be fixed to the compass rose 6, either by holding them together while the compass rose is rotated or by tightening a thumb screw 14 on a clamp 15, that is carried by the chart holder 7 and engages the compass rose 6 through a slot 17 in the compass rose. The engagement of the clamp 15 with the slot 17 limits rotation of the chart holder 7 relative to the compass rose 6 to the arc subtended by the slot 17 from the axle 4. This arc should be more than the greatest magnetic variation likely to be incurred in the use of the navigation aid.

Next, with the chart holder positioned on the compass rose at the selected magnetic variations and the two held together either by tightening the thumb screw 14 or by simply holding them together, the compass rose is rotated and the transparent overlay 3 is positioned along the track 2, so that one of the vertical lines such as 10 in the overlay falls on both the departure point denoted L and the destination point denoted A on the chart. When these steps are taken, the magnetic heading to pursue a course from L to A on the chart is indicated on the compass rose by the index 19 at the top center of the baseboard 1. For purposes of the example shown in FIG. 1, this magnetic heading is about 340°. For this course from L to A, forward is toward the top and backward is toward the bottom of the aid.

Second Embodiment

Figure 4:
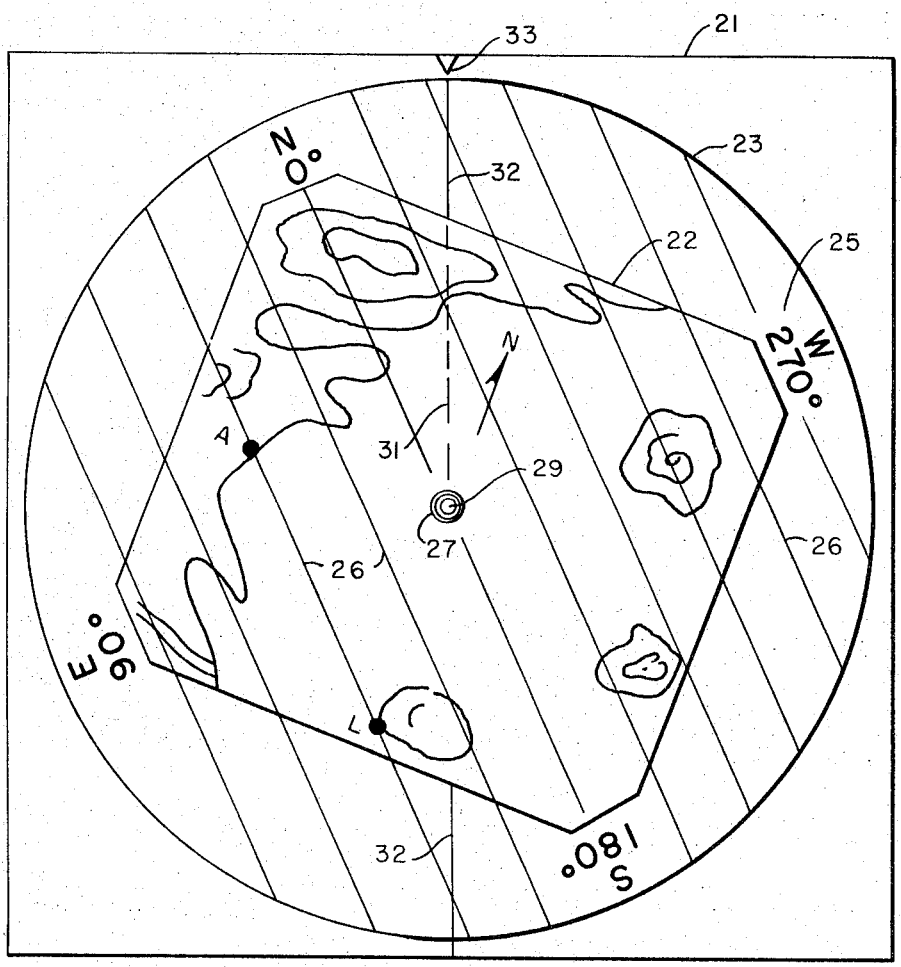
FIG. 4 is a plan view of a second embodiment of the invention in which the transparent overlay is rotatable and contains both the compass rose and course lines as a unitary piece.
Figure 5:
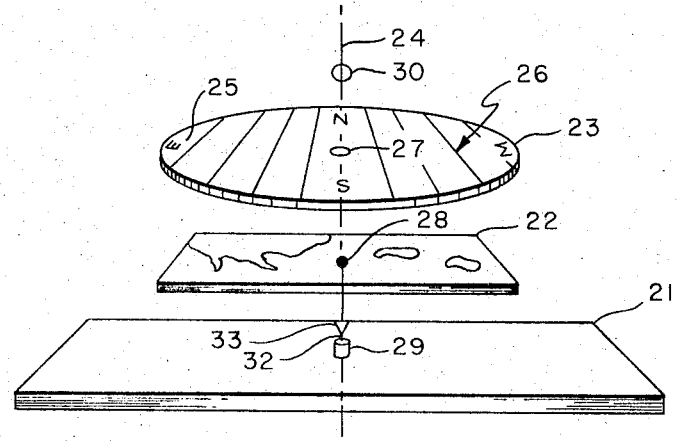
FIG. 5 is a front perspective exploded view of the second embodiment.

The second embodiment of the invention illustrated by the plan view of the navigation aid, FIG. 4, and a perspective exploded view in FIG. 5, includes the compass rose as part of the transparent overlay on top of rather than beneath the chart. Here, the compass rose and overlay of course lines are combined as a unitary piece. The three parts to this embodiment of the navigation aid include the baseboard 21, the chart 22, and the compass rose - course line overlay 23, all attached on a common axis 24, on which the chart and compass rose overlay are independently rotatable with respect to the baseboard 21. The overlay 23 contains the heading numbers 25 at its periphery and also contains the course lines 26, like the lines on the transparent overlay 3 in the first embodiment. The course lines 26 here consist of a set of parallel lines across the face of the overlay. In use, one of these lines will be coincident or nearly coincident with the departure point denoted L' and the destination point denoted A' on the chart. Since the chart must be visible through the overlay, the overlay is preferably made of glass or clear plastic. Furthermore, since the chart is preferably readily replaceable, the attachment of the compass rose and the chart on the axis 24 preferably allows the chart to be removed easily from beneath the compass rose and replaced with another chart, with the axis 24 going through a predetermined point at the center of the chart.

One convenient technique of construction of the navigation aid shown in FIGS. 4 and 5 employs simple snap fasteners for attaching the overlay of compass rose and course lines, the chart, and the baseboard together, so that the overlay and chart are independently rotatable on the baseboard. A yet simpler arrangement is to provide a reinforced hole 27 at the center of the overlay 23 and a reinforced hole 28 at the center of the chart 22 and a post 29 at the center of the base of size to accommodate these holes. With either of these structural arrangements, a chart is removed and replaced by first removing the overlay of compass rose and course lines from the post, then mounting a new chart on the post and replacing the overlay on the post. A cap 30 may be provided for the end of the post to keep the chart and overlay from falling off.

The compass rose heading numbers 25 on the overlay 23 increase in the counterclockwise direction as viewed in FIG. 4. This is required where the course lines 26 run north and south on the overlay as shown, and the aid is used as follows:

First, the chart 22 is rotatably positioned on the base 21, so that a magnetic deviation line 31, running through the center of the chart through the mounting hole 28 is coincident with the line 32, extending from top to bottom of the base 21, through the post 29. The magnetic deviation is shown here as 20° West of North and is the usual representation of the deviation on a chart. Then, the overlay 23 is rotated on the axis 24 to place one of the set of lines 26 coincident with the two points L and A, which are the departure and destination points, respectively, on the chart. In FIG. 4, the line 26' is shown coincident with these points on the chart. Then the magnetic heading is read as the compass rose reading adjacent the index 33 at the top center of the board 21.

Third Embodiment

Figure 6:
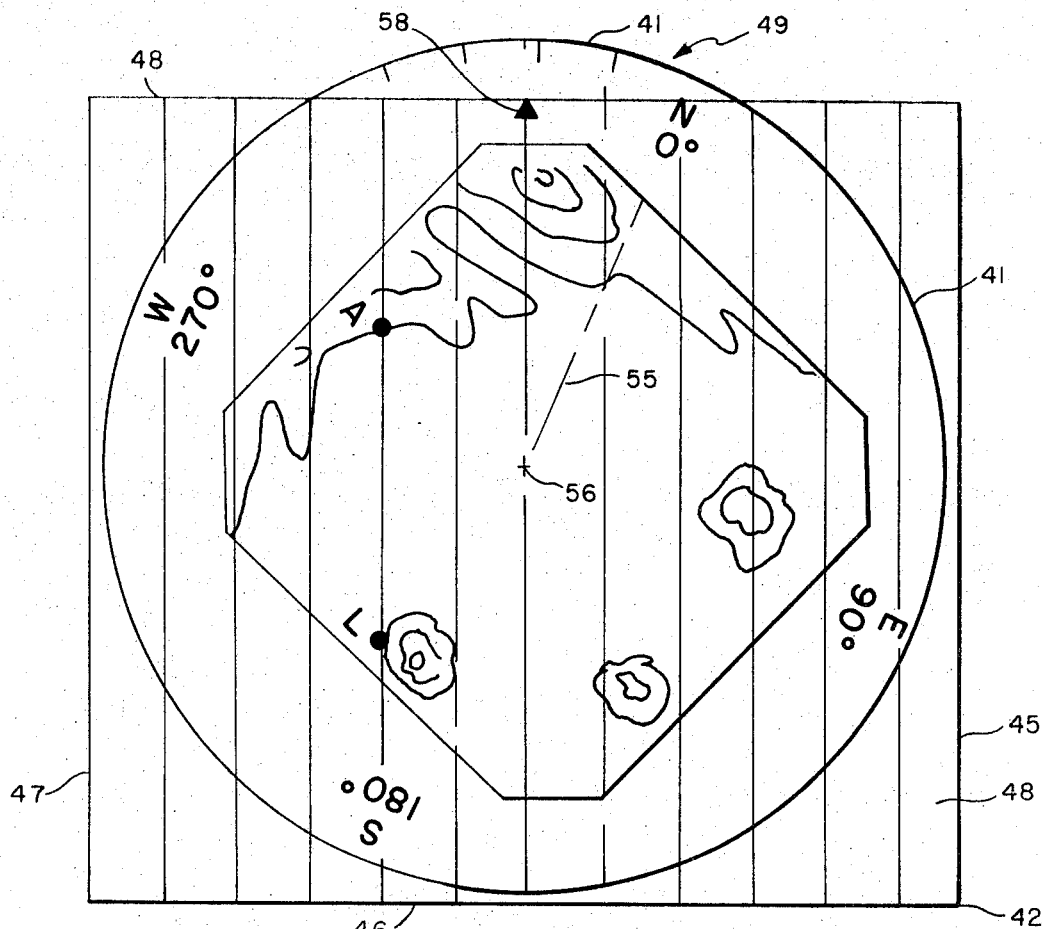
FIG. 6 is a plan view of a third embodiment of the invention in which the chart and compass rose are combined as a unitary rotatable piece.
Figure 7:
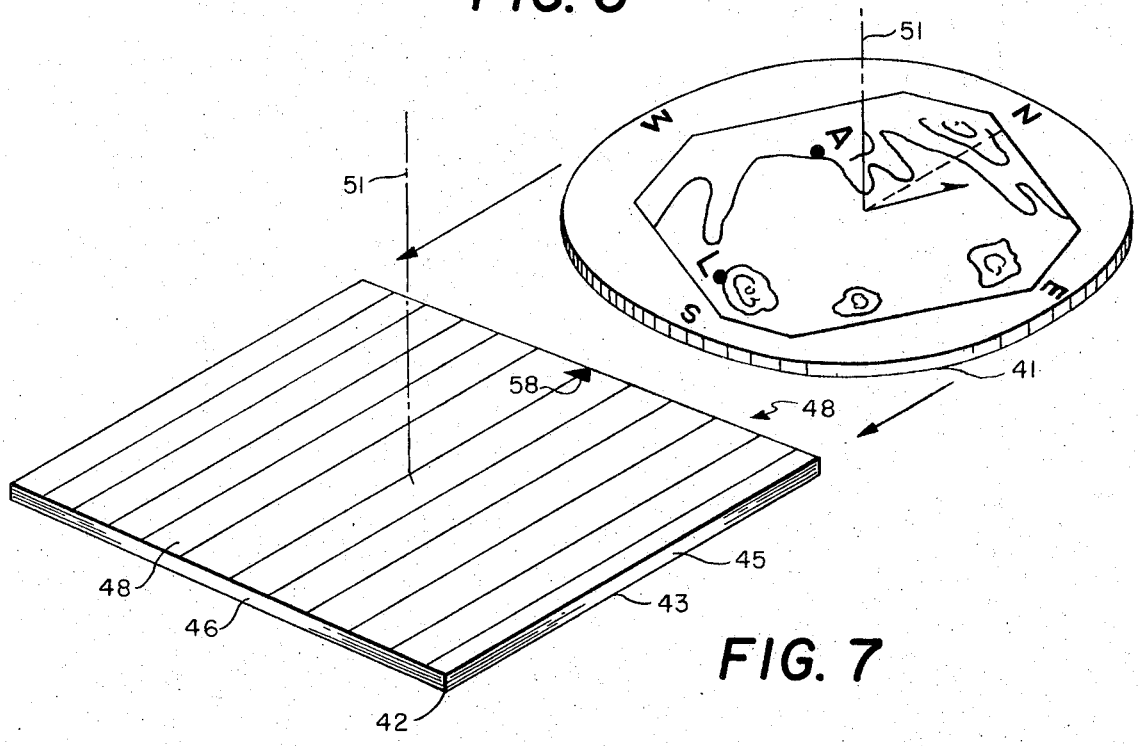
FIG. 7 shows the third embodiment with the unitary chart and compass rose removed from the platform and overlay.

The third embodiment of the navigation aid, illustrated by FIGS. 6 and 7, includes the chart and compass rose combined as one unitary rotatable (circular) piece 41 and the course line overlay and base or platform combined as another unitary piece 42. Thus, in this embodiment, the aid is assembled of only two pieces.

The combined course line overlay and base 42 defines an envelope into which the circular rotatable piece 41 is inserted. The envelope may be substantially square as shown, with the base 43 and the transparent overlay of course lines 44 connected along three edges 45, 46, and 47 and open at the fourth edge 48 to accept the rotatable piece 41. The width of this envelope (edge 46) is the same as the diameter of piece 41 and the depth (edge 45) is somewhat less, so that a part of the circular piece 41 protrudes from the envelope at 49 enabling the piece to be rotated in the envelope on axis 51 which is substantially coincident with the axis 52 of piece 41.

The chart 53 and compass rose numbers 54 may be imprinted on the piece 41, or the chart may be a square section as shown fixedly attached to circular piece 41. The chart is oriented with respect to the compass rose numbers with the magnetic variation line 55 on the chart extending from the center thereof to the compass zero degree number or North. In this example, the chart magnetic variation is 20° West, and so the chart is oriented with magnetic deviation line 55 in the direction of zero degrees or North on the compass rose. It is convenient to obtain this orientation if the center 56 of the chart coincides with the axis 52 of the piece 41.

The aid shown assembled in FIG. 6 is used by rotating the compass rose and chart (piece 41) in the envelope 43 so that one of the course lines such as line 57 in the overlay part of the envelope is coincident with or at least parallel to a line coincident with the departure and destination points L and A on the chart. The magnetic heading for this course is indicated by the index 58 at the top center of the envelope which points to the magnetic compass heading on the compass rose. In the example shown this heading is about 320°.

The three embodiments of the present invention described herein have important features in common, which are the generic features of the invention, and are set forth in the accompanying claims. These embodiments which represent the best uses of the invention each also have different structural features by which some of the advantages mentioned herein are gained. These navigation aid devices are particularly useful on a small craft, such as a small boat, where space is limited and where there is often much water spray and dampness, and they are particularly suitable for use with a library of small charts, which can be readily removed from and inserted into the aid.

In view of the uses intended, it is preferred that the charts and compass rose in the embodiments be highly resistant to moisture and the overall dimensions be limited, so that the aid can be easily manipulated on a small craft. Further advantages can be achieved if the chart and compass rose and transparent overlay are made of flexible plastic, or the chart is sealed in clear plastic.

While three embodiments of the invention are shown and described herein, it will be apparent to those skilled in the art that other adaptations and modifications can be made without departing from the spirit and scope of the invention, as set forth in the accompanying claims.

What is claimed is:

1. A navigation aid for determining the magnetic compass heading to reach a destination from a departure point comprising,
   a base having a surface,
   means defining an axis of rotation extending from substantially the center of the surface perpendicular thereto,
   a chart about said axis of rotation and rotatable with respect to the surface,
   a compass rose concentric with said axis and rotatable thereon with respect to the surface,
   an index on the surface for the compass rose,
   a magnetic variation index on the chart and a magnetic variation scale on the compass rose, and
   means providing course lines overlaying the chart, whereby the chart and compass rose are independently rotatable on the axis, the index on the chart aligning with a reading of the scale to account for magnetic variation when and a course line is in registration with the departure and destination points on the chart, so that the index on the surface designates the magnetic compass heading on the compass rose to reach the destination from the departure point.

2. A navigation aid as in claim 1 wherein,
   the overlay with course lines is a transparent sheet attached to the surface along one edge of the sheet and pivotal about said edge.

3. A navigation aid as in claim 1 wherein,
   the overlay of course lines slides along a track along one edge of the surface.

4. A navigation aid as in claim 1 wherein,
   a holder is provided for the chart and the index on the chart is fixed to the holder.

5. A navigation aid as in claim 4 wherein,
   the chart is mounted to the holder and the holder is rotatable on the axis thereby rotating the chart on the axis.

6. A navigation aid as in claim 5 wherein,
   the compass rose is between the chart holder and the surface,
   a magnetic variation scale is included inside the compass rose, and
   the magnetic variation index on the holder is adjacent said scale.

7. A navigation aid as in claim 6 wherein,
   the aid is so constructed that,
   the holder is positioned on the compass rose with the magnetic variation index at the magnetic variation on the scale, which is the magnetic variation for the chart in the holder, and
   then the compass rose and holder are rotated on the axis together to place a course line from the overlay coincident with destination and departure points on the chart,
   whereby the index on the surface indicates the magnetic compass heading on the compass rose for a course from the departure point to the destination point.

8. A navigation aid for determining the magnetic compass heading to reach a destination point from a departure point comprising,
   a rotatable flat piece containing on one surface thereof a chart and a compass rose in fixed relationships to each other, the compass rose defining a rotation axis transverse to the surface of the piece,
   the chart being oriented with the north magnetic variation line thereof aligned with north on the compass rose, a transparent flat piece overlaying the rotatable piece surface and having parallel course lines stationary thereon, means for holding the rotatable piece adjacent and parallel the overlay so that the course lines are superimposed on the chart and the rotatable piece is rotatable on said axis relative to the overlay, and an index on the overlay for the compass rose, whereby, upon rotating the rotatable piece to place the same course line over both a departure and a destination point on the chart, the magnetic compass heading for the course from said departure to destination is indicated by the index on the compass rose.

9. A navigation aid as in claim 8 wherein, the course line overlay is one side of an envelope into which said rotatable flat piece of compass rose and chart is inserted and rotatably positioned therein on said axis, and the index which designates compass heading on the compass rose may be on the overlay or the other side of the envelope.

* * * * *